(12) United States Patent
Graham

(10) Patent No.: US 9,441,767 B2
(45) Date of Patent: Sep. 13, 2016

(54) ELONGATE TAPE AND METHOD OF PRODUCING SAME

(75) Inventor: Geoffrey Stephen Graham, Tyne & Wear (GB)

(73) Assignee: GE Oil & Gas UK Limited, Nailsea, Bristol (GB)

(*) Notice: Subject to any disclaimer, the term of this patent is extended or adjusted under 35 U.S.C. 154(b) by 148 days.

(21) Appl. No.: 14/240,492

(22) PCT Filed: Aug. 16, 2012

(86) PCT No.: PCT/GB2012/052009
§ 371 (c)(1),
(2), (4) Date: Feb. 24, 2014

(87) PCT Pub. No.: WO2013/030532
PCT Pub. Date: Mar. 7, 2013

(65) Prior Publication Data
US 2014/0318662 A1    Oct. 30, 2014

(30) Foreign Application Priority Data

Sep. 1, 2011 (GB) .................................. 1115069.5

(51) Int. Cl.
*F16L 11/16* (2006.01)
*F16L 11/08* (2006.01)
(Continued)

(52) U.S. Cl.
CPC .............. *F16L 11/16* (2013.01); *B29D 23/001* (2013.01); *F16L 11/083* (2013.01); *F16L 11/24* (2013.01); *Y10T 428/24488* (2015.01)

(58) Field of Classification Search
USPC ................................................. 138/129, 135
See application file for complete search history.

(56) References Cited

U.S. PATENT DOCUMENTS 4,377,186 A * 3/1983 Genini ................... F16L 11/083
                                                    138/111
4,800,928 A * 1/1989 Kanao ..................... F16L 11/16
                                                    138/122

(Continued)

FOREIGN PATENT DOCUMENTS

CN    1039096 A    1/1990
CN    1316609 A    10/2001
(Continued)

OTHER PUBLICATIONS

PCT International Preliminary Report of Patentability and Written Opinion for PCT/GB2012/052009, mailed Mar. 4, 2014 (7 pages).

(Continued)

*Primary Examiner* — James Hook
(74) *Attorney, Agent, or Firm* — Reza Mollaaghababa; Thomas Engellenner; Pepper Hamilton LLP

(57) ABSTRACT

An elongate tape and method of producing an elongate tape are disclosed. The tape is suitable for forming a helically wound layer of interlocked windings in a flexible pipe body, and is configured for interlocking with adjacent windings, wherein the tape has a cross-sectional profile including: a first surface that in use forms a radially inner surface of the helically wound layer; a further surface, in use forming a side wall extending radially outwards, away from the first surface, and for forming a contact surface with a region of an adjacent winding; and a transition surface joining the first surface and further surface, wherein the transition surface comprises a curved surface, and wherein the curved surface has a larger radius of curvature in a region proximate the first surface than in a region proximate the further surface.

25 Claims, 6 Drawing Sheets

(51) Int. Cl.
*B29D 23/00* (2006.01)
*F16L 11/24* (2006.01)

(56) References Cited

U.S. PATENT DOCUMENTS

| | | | | |
|---|---|---|---|---|
| 5,275,209 | A | * | 1/1994 | Sugier ............... F16L 11/16 138/129 |
| 5,730,188 | A | * | 3/1998 | Kalman ............... F16L 9/16 138/129 |
| 5,813,439 | A | * | 9/1998 | Herrero ............... F16L 11/082 138/130 |
| 6,354,333 | B1 | | 3/2002 | Dupoiron et al. |
| 6,594,608 | B1 | | 7/2003 | Averbuch et al. |
| 7,055,551 | B2 | * | 6/2006 | Fraser ............... B21C 37/154 138/132 |
| 2005/0208270 | A1 | * | 9/2005 | Liang ............... F16B 4/00 428/156 |
| 2014/0345741 | A1 | * | 11/2014 | Graham ............... F16L 11/083 138/137 |

FOREIGN PATENT DOCUMENTS

| | | |
|---|---|---|
| FR | 2664019 A1 | 1/1992 |
| WO | 2005090848 A2 | 9/2005 |

OTHER PUBLICATIONS

International Search Report, PCT/GB2012/052009, mailed Dec. 5, 2012 (3 pages).
Notification of the First Office Action issued Mar. 30, 2015 with Text of the First Office Action corresponding to Chinese Application No. 201280042822.5 (4 sheets).
Search Report issued Mar. 20, 2015 corresponding to Chinese Application No. 201280042822.5 (2 sheets).

* cited by examiner

ELONGATE TAPE AND METHOD OF PRODUCING SAME

The present invention relates to an elongate tape and a method of producing the same. In particular, but not exclusively, the present invention relates to an elongate tape for forming a helically wound layer of interlocked windings for a pressure armour layer in a flexible pipe body. Such flexible pipe body is suitable for use in the oil and gas industry.

Traditionally flexible pipe is utilised to transport production fluids, such as oil and/or gas and/or water, from one location to another. Flexible pipe is particularly useful in connecting a sub-sea location (which may be deep underwater) to a sea level location. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

In many known flexible pipe designs the pipe body includes one or more pressure armour layers. The primary load on such layers is formed from radial forces. Pressure armour layers often have a specific cross sectional profile to interlock so as to be able to maintain and absorb radial forces resulting from outer or inner pressure on the pipe. Cross sectional profiles of the wound wires that prevent the pipe from collapsing or bursting as a result of pressure are sometimes called pressure-resistant profiles. When pressure armour layers are, formed from helically wound wires forming hoop components, the radial forces from outer or inner pressure on the pipe cause the hoop components to expand or contract, putting a tensile load on the wires.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of conveyed fluids cooling to a temperature that may lead to pipe blockage. Increased depths also increase the pressure associated with the environment in which the flexible pipe must operate. As a result the need for high levels of performance from the pressure armour layers of the flexible pipe body is increased.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

In addition, it has been found by the present inventors that with certain pressure-resistant profiles, layers adjacent to the pressure armour layer may become damaged.

WO98/16770, WO2009/087348, WO2010/055323, US2004/0182462, US2010/0059134, U.S. Pat. No. 6,739,355, U.S. Pat. No. 5,275,209, U.S. Pat. No. 6,192,941, U.S. Pat. No. 6,283,161, U.S. Pat. No. 6,065,501, EP1141606, EP1395769 and U.S. Pat. No. 4,549,581 disclose windings with various shaped cross-sections.

It is an aim of the present invention to at least partly mitigate the above-mentioned problems.

It is an aim of embodiments of the present invention to provide an improved tape profile for forming a helically wound layer of interlocked windings for a pressure armour layer.

It is an aim of embodiments of the present invention to provide a tape profile suitable for forming a pressure armour layer, which reduces or eliminates stress to neighbouring layers in a flexible pipe body.

It is an aim of embodiments of the present invention to provide a tape profile suitable for forming a pressure armour layer, which reduces the risk of damaging a neighbouring fluid retaining layer.

According to a first aspect of the present invention there is provided an elongate tape for forming a helically wound layer of interlocked windings in a flexible pipe body, the tape being configured for interlocking with adjacent windings, wherein the tape has a cross-sectional profile comprising:
  a first surface that in use forms a radially inner surface of the helically wound layer;
  a further surface, in use forming a side wall extending radially outwards, away from the first surface, and for forming a contact surface with a region of an adjacent winding; and
  a transition surface joining the first surface and further surface,
  wherein the transition surface comprises a curved surface, and wherein the curved surface has a larger radius of curvature in a region proximate the first surface than in a region proximate the further surface.

According to a second aspect of the present invention there is provided a method of manufacturing flexible pipe body, comprising helically winding one or more tapes of the type described above around a substantially tubular underlayer.

Certain embodiments of the invention provide the advantage that the first surface may be helically wound to form windings of a pressure armour layer, such that layers beneath (radially inwards) the pressure armour layer are not subject to large variations in contact stress and strain in the layers.

Certain embodiments of the invention provide the advantage that abrupt strain variation in an adjacent polymer barrier layer or liner is reduced or prevented.

Certain embodiments of the invention provide a curved surface that has a radius of curvature that decreases from the first surface to the further surface. A flexible pipe body can be produced having a pressure armour layer and a radially inner polymer barrier layer or liner. With such a curved surface, the contact stresses on the polymer layer in areas near the portions of the armour layer between the windings are gradually eased away with the changing curvature.

Certain embodiments of the invention provide the advantage that a flexible pipe body is provided that has improved performance and lifetime span. In particular, the possibility of burst-through of a fluid retaining layer is averted.

Embodiments of the invention are further described hereinafter with reference to the accompanying drawings, in which:
  FIG. 1 illustrates a flexible pipe body;
  FIG. 2 illustrates a riser, flowline and jumper;
  FIG. 3 illustrates a portion of a known flexible pipe body;

In the drawings like reference numerals refer to like parts.

Figure 1:
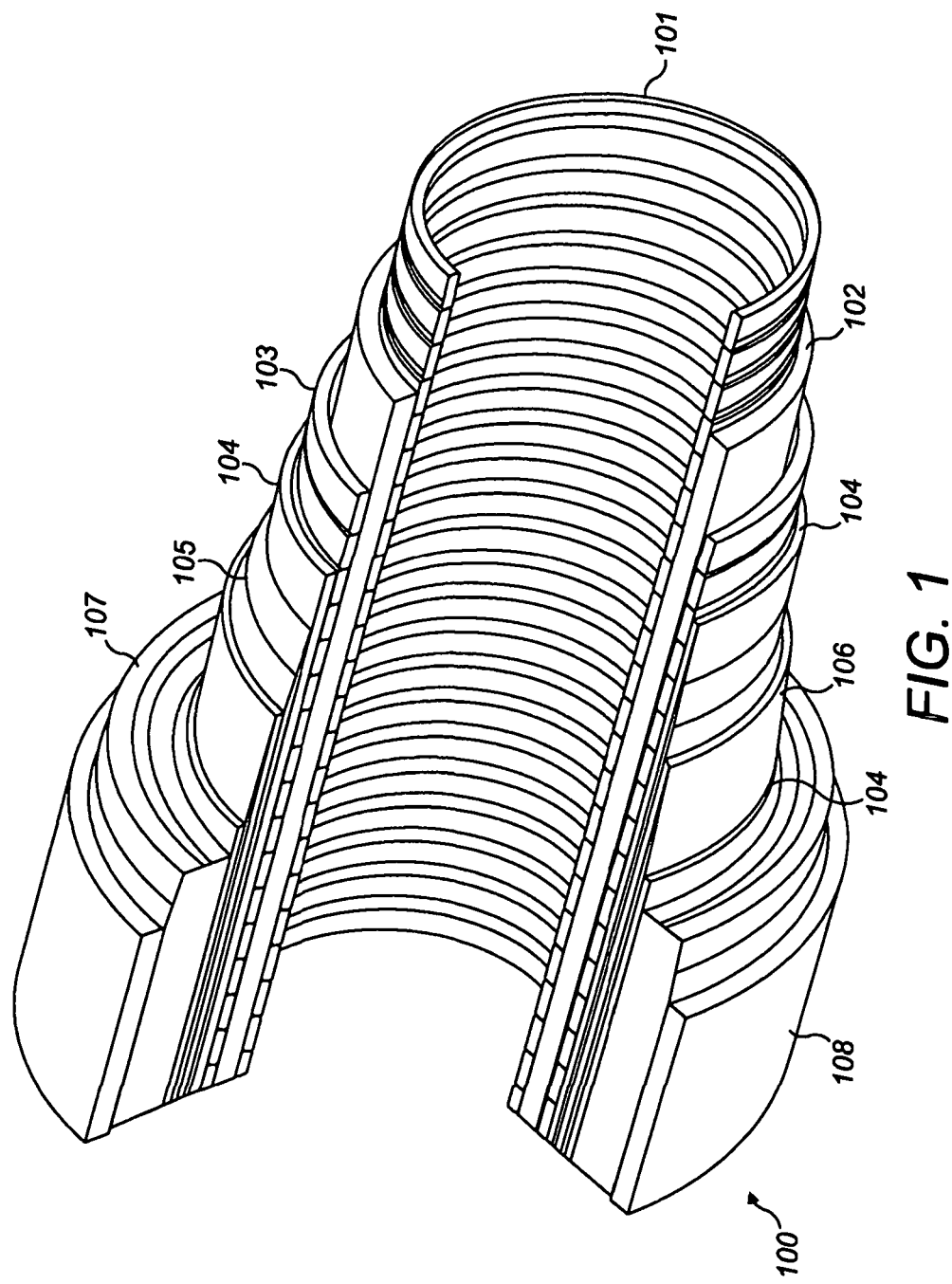

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

A pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
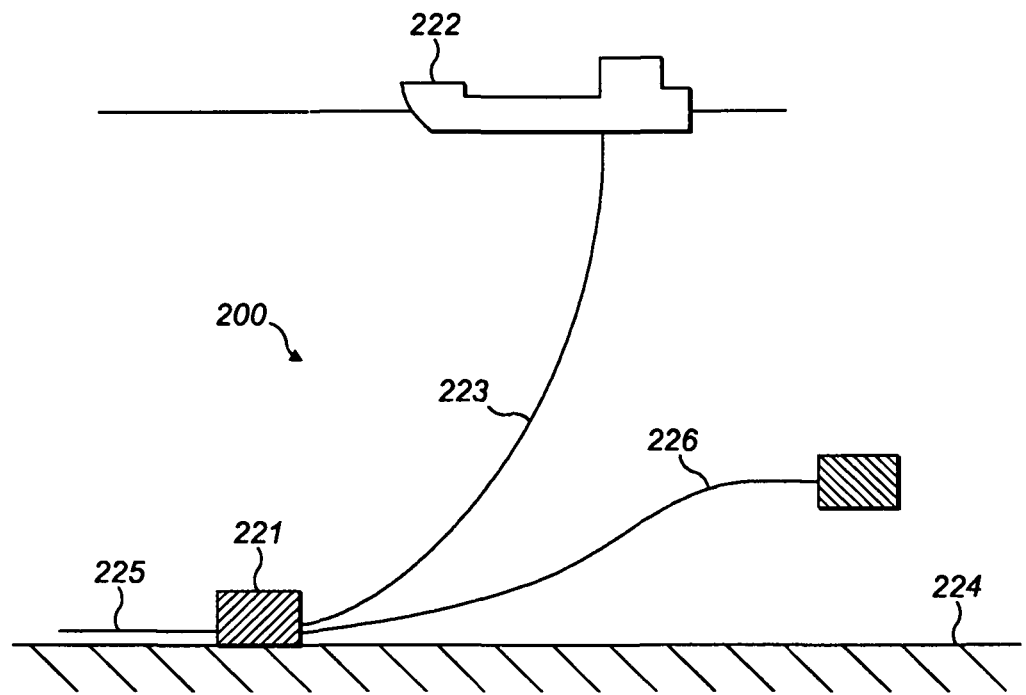

FIG. 2 illustrates a riser assembly 200 suitable for transporting production fluid such as oil and/or gas and/or water from a sub-sea location 201 to a floating facility 222. For example, in FIG. 2 the sub-sea location 201 includes a sub-sea flow line. The flexible flow line 225 comprises a flexible pipe, wholly or in part, resting on the sea floor 224 or buried below the sea floor and used in a static application. The floating facility may be provided by a platform and/or buoy or, as illustrated in FIG. 2, a ship. The riser assembly 200 is provided as a flexible riser, that is to say a flexible pipe 223 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 225 or jumper 226.

As mentioned above, it has been discovered by the present inventors that with certain pressure-resistant profiles, layers adjacent to the pressure armour layer may become damaged over time. It has been identified that the problem is due to strain variation within the layers, in particular the fluid retaining layer.

Figure 3:
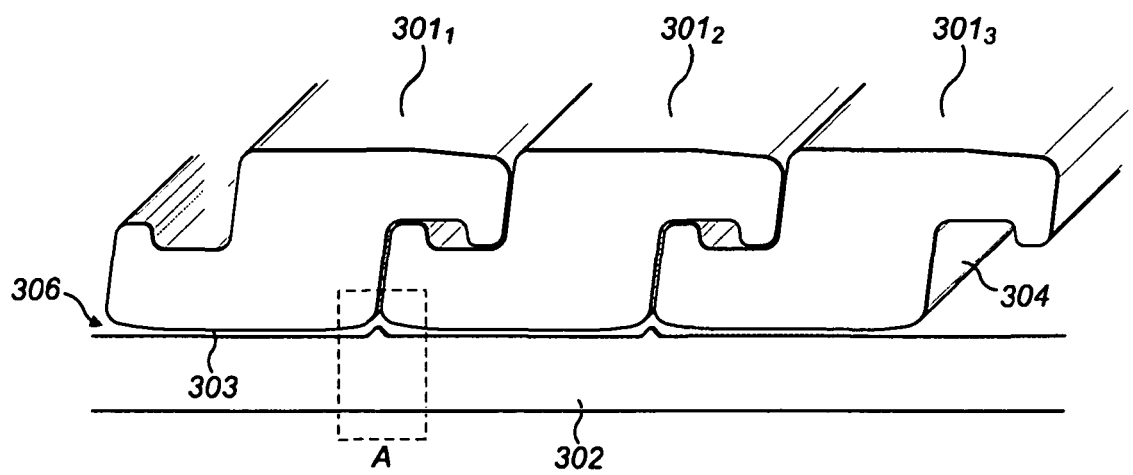
Figure 4:
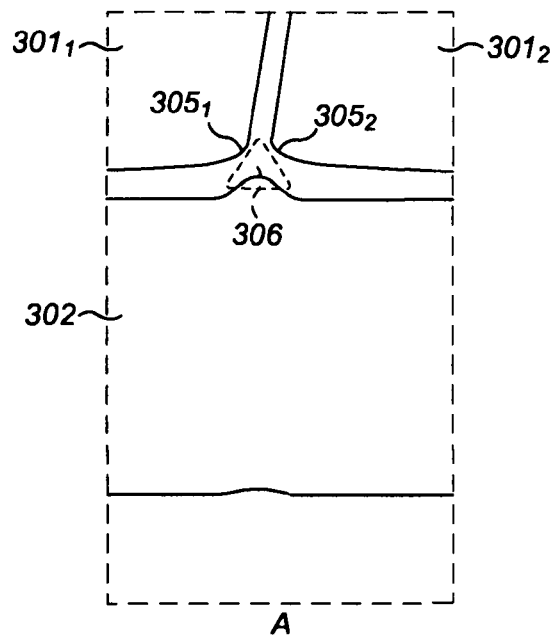
FIG. 4 illustrates an enlarged view of the section A shown in FIG. 3.

FIG. 3 illustrates a portion of a known flexible pipe body including windings $301_{1-3}$ of a pressure armour layer and a radially inner polymer fluid retaining layer 302. FIG. 4 shows an enlarged view of section A of FIG. 3. As a tape is wound to form the pressure armour layer, an inner surface 303 of the pressure armour layer is formed from one edge of the tape profile by the repeated, adjacent windings. Of course, a single tape may be wound as a repeated winding (as shown in FIG. 3), or several tapes, possibly of different profiles, may be successively wound, with one edge of each tape profile forming the inner surface of the armour layer. Either way, a base contact surface of each profile forms an inner surface 303 of the armour layer.

In the regions, where successive windings come together, along the length of the edges 304 of each winding, it is usually the case that the edge of the tape profile forming the inner (base) surface curves away from the base towards each side wall of the tape profile at a small, constant radius of curvature $305_1$. Similarly, an adjacent winding will also curve away from the inner surface towards a side wall at a small, constant radius of curvature $305_2$. This leaves a very approximate triangle shape of space 306 between the adjoining windings and the adjacent, radially inner layer, e.g. the polymer barrier layer 302. In this region 306, it has been found that the underlying layers, e.g. polymer barrier layer 302 and/or intermediate polymer sacrificial layer (not shown), may creep into these triangles of space. This is because the high internal pressure from fluids conveyed through the pipe force the radially inner layers towards the pressure armour layer and into the spaces between the windings. This causes localised regions where part of the polymer layer is in contact with the base of the pressure armour layer and part of the polymer that is unsupported and forced into the gap between windings. In this localised region where the windings come together, the abrupt change in support to the layers underlying the pressure armour layer causes high shear and strain to the material of those underlying layers. This may result in cracking or micro-crazing.

In flexible pipes the layers underlying the pressure armour layer are often polymer layers, such as PVDF (polyvinylidene fluoride) although it will be appreciated that many materials may be suitable, such as polymers, metals, or composites. A suitable material may be chosen by the pipe designer to match the conditions of use of the pipe. However, most materials will have a certain maximum allowable strain above which the risk of damage to the material is much greater. As such, the presence of the above-described gaps between windings of a pressure armour layer can lead to potential damage and potential failure in the underlying layers. When an area of polymer is under strain, the properties of that area may be changed such that it becomes weaker. In areas of strain, the polymer is more easily deformed than the surrounding material, causing an even higher level of strain in the polymer, which can result in a plastic hinge effect.

Figure 5:
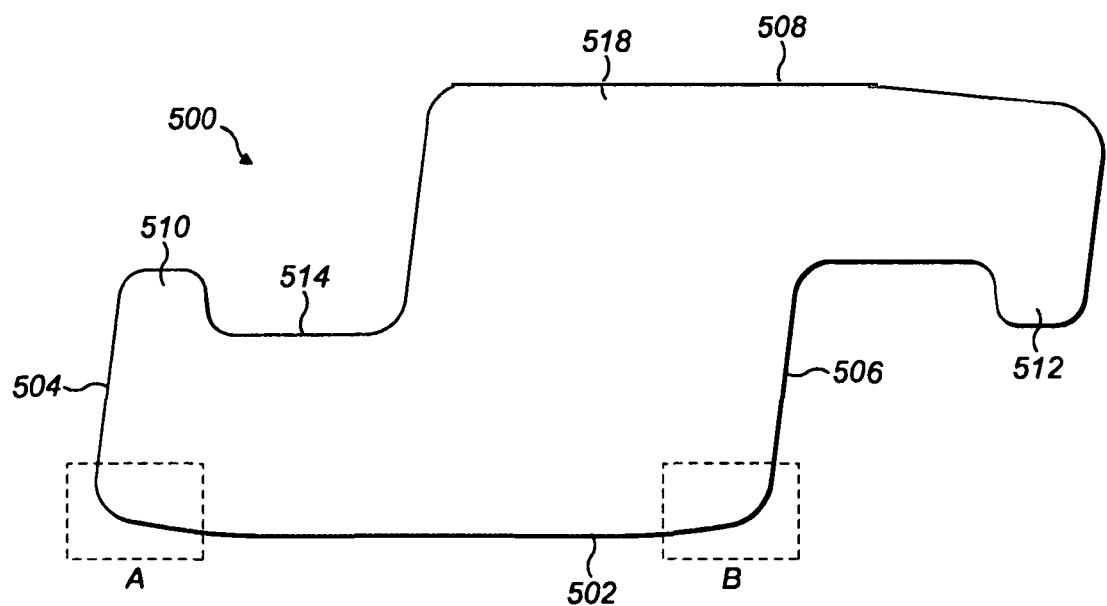
FIG. 5 illustrates a cross section profile of a pressure armour tape.

FIG. 5 shows a cross section of a tape 500 for forming a pressure armour layer 103 according to an embodiment of the present invention. It will be understood that throughout this specification, reference is made to a tape and it will be understood that this term is to be broadly construed as encompassing any elongate structure having a preformed cross section that can be wound in a helical manner around an underlying structure. In this embodiment, the tape is carbon steel and the profile of the cross section has a substantially block like nature.

The elongate tape 500 has a profile that includes a first surface 502 that in use forms a radially inner surface of a helically wound layer, a second (further) surface 504 that in use forms a side wall extending radially outwards, away from the first surface 502, a third (yet further) surface 506 that in use forms a further side wall extending radially outwards, away from the first surface 502, and a fourth surface 508 that, in use forms a radially outer surface of a helically wound layer. The first and fourth surfaces 502,508 are substantially parallel and spaced apart. The second and third surfaces 504,506 are substantially parallel and spaced apart. The first surface 502 is polymer facing, in use.

In this embodiment the tape has an approximately "Z" shaped profile including a leading edge hook 510 and a trailing edge hook 512. These hooks have been described in WO98/16770, incorporated herein by reference, and for brevity will not be specifically described. However, it is noted that as the tape is helically wound to form a layer, adjacent windings will be interlocked by a trailing edge hook of a first winding nesting in a valley region 514 of an adjacent winding, the valley region being between the leading edge hook and a main body portion 518.

Figure 6:
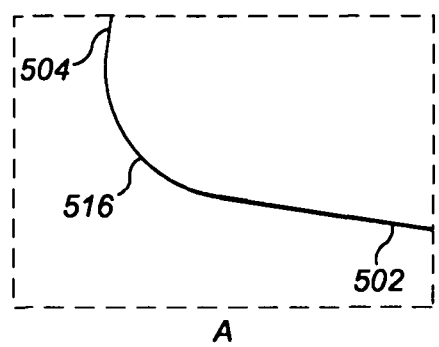
FIG. 6 illustrates an enlarged view of the section A shown in FIG. 5.
Figure 7:
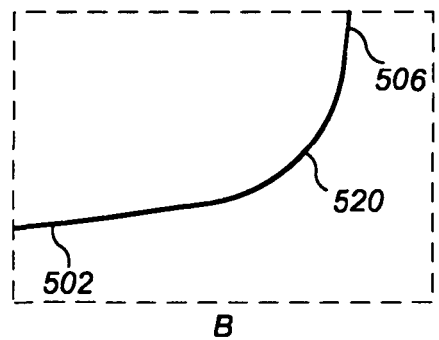
FIG. 7 illustrates an enlarged view of the section B shown in FIG. 5.

As can be seen from FIGS. 6 and 7, which show enlarged views of the sections A and B of FIG. 5, the first surface 502 curves at its ends to transition into the second and third surfaces 504,506 respectively. As used herein, for clarity these two curved sections 516,520 of the profile will be termed a transition surface, although it will be clear that the transition surface need not technically be a separate surface and could be part of the first surface, or the second or third surface.

The transition surface 516 has a larger radius of curvature in a region proximate the first surface 502 than in a region proximate the second surface 504. The transition surface 520 has a larger radius of curvature in a region proximate the first surface 502 than in a region proximate the third surface 506.

The transition surface 520 generally mirrors the transition surface 516, although the side walls 504,506 need not be perpendicular to the first surface 502. In fact the side walls 504,506 in this embodiment each slant slightly away from a 90° line.

Figure 8:
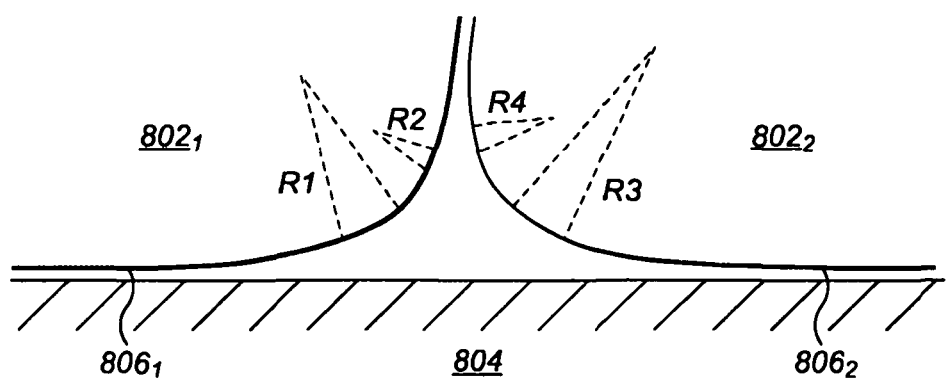
FIG. 8 illustrates a partial view of two tape windings of the present invention.

FIG. 8 illustrates the region where adjacent windings come together, with two adjacent windings $802_{1-2}$ and a fluid retaining layer 804. As illustrated in FIG. 8, a base surface (polymer facing surface) $806_1$ of a winding curves away from the axis, gently at first, and then becomes steeper.

A shallow, gradual curve (of a large circle) has a large radius of curvature and a tighter curve (of a small circle) has a small radius of curvature. As such, from the radially innermost base $806_1$ of the pressure armour layer, the radius of curvature starts as a large radius R1 of a large circle, and then decreases to a smaller radius R2.

Also, the base surface $806_2$ of winding $802_2$ curves away from the axis, gently at first, and then becomes steeper. From the radially innermost base $806_2$ of the pressure armour layer, the radius of curvature starts as a large radius R3 of a large circle, and then decreases to a smaller radius R4.

Figure 9:
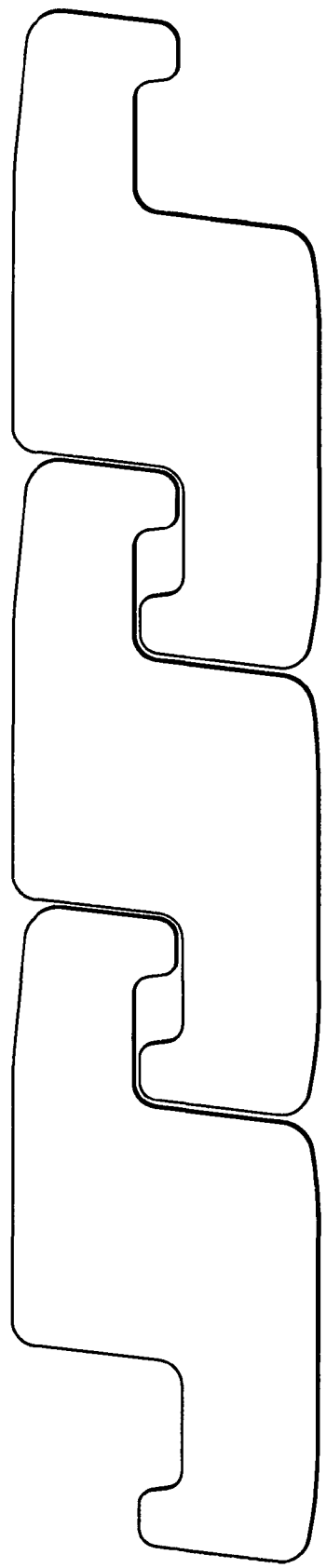
FIG. 9 illustrates a portion of a pressure armour layer of interlocked winding tape.

FIG. 9 illustrates a cross sectional profile of a portion of a pressure armour layer formed with a tape as described above. The tape is helically wound over an underlying tubular layer or mandrel, with the tape side wall (second or third surface) approximately meeting the opposite side wall, to form a tubular layer. It will be appreciated that there will be some margin for movement of the helical windings, as the pipe bends and flexes to a degree.

However, this will not substantially affect the distribution of pressure between the pressure armour layer and the underlying layer.

Aptly, each transition surface blends smoothly from the first surface to the second or third surface.

With the above-described curved transition surface, an abrupt change in contact stress and strain within the material of an adjacent layer is avoided. That is, the contact stresses on the polymer layer, in areas near the portions of the armour layer between the windings, are gradually eased away with the changing curvature. Thus pressure is gradually changed over the area where windings meet. The polymer layer undergoes a slowly increasing rate of change in contact stress. As such the transition from being fully supported to unsupported along the base of the pressure armour layer is smoothly effected, and the overall level of shear and strain forces in the polymer layer are reduced compared to known arrangements.

In addition, the gap formed between adjacent windings and the adjacent radially inner layer is minimised, such that there is no space for large amounts of the inner layer to creep into that gap.

Furthermore, sharp edges on the pressure armour layer in contact with the adjacent radially inner layer are avoided.

The strength of the pressure armour layer itself is effectively unchanged compared to known configurations. Thus the pressure armour layer will continue to satisfactorily support and restrain the fluid retaining layer when the fluid retaining layer is subjected to high internal pressures from conveyed fluid in the flexible pipe.

It has been found that when the curvature of the transition surface resembles a half of a parabola (split vertically down the centre or y axis, herein called "semi-parabolic"), or exponential curve, then particularly good results can be achieved. Generally, when the radius of curvature changes (decreases) at a constant rate of change, then good results may be achieved.

The above-described invention is suitable for use in various applications, including use as a pressure armour layer in all high pressure flexible pipes and risers such as those where a PVDF barrier system is used.

Various modifications to the detailed designs as described above are possible. For example, the materials described above are examples only and many materials may be suitable for the particular pipe layers. The tape may be a polymer, elastomer, plastic, thermoplastic, thermosetting polymer, PVDF, a metal, stainless steel, an alloy, or a composite, for example. The adjacent layer may be of polymer, PVDF, a metal, or a composite, for example.

Although a generally Z-shaped profile has been described above, it will be appreciated that the present invention may apply to many different profiles of elongate tapes.

Although the elongate tape has been described above as suitable for forming a pressure armour layer of a flexible pipe, it will be realised that the tape may be used for various other purposes. For example, the tape may be employed to form other layers of a flexible pipe, such as a tensile armour layer.

Figure 10:
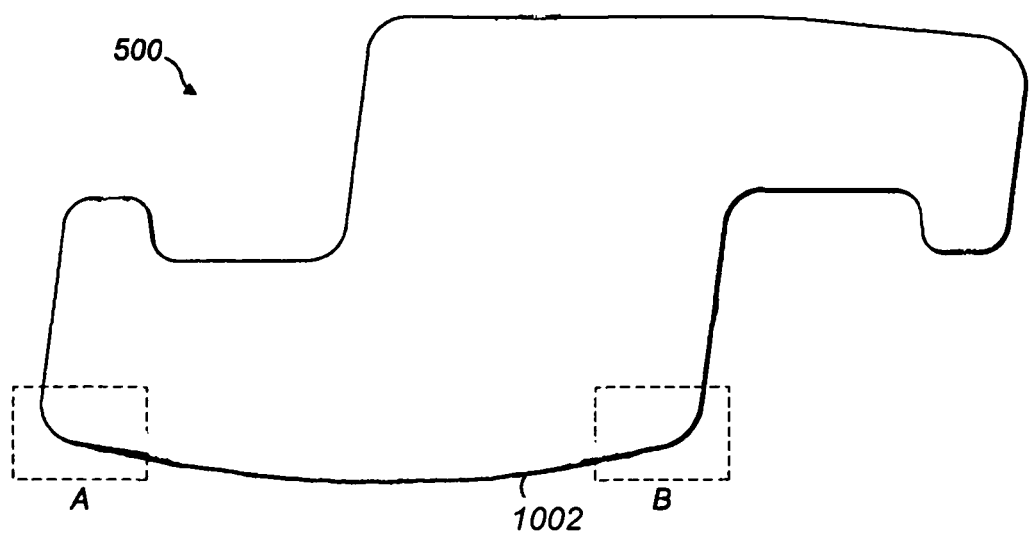
FIG. 10 illustrates a cross section profile of a pressure armour tape.

In the example described above, the first (radially innermost) surface of the tape is flat (forming a straight line) along a central portion of the surface. Alternatively, as shown in FIG. 10, the first surface 1002 could be entirely curved, for example having a very gently curve of large radius of curvature along a major portion, and then graduating to a smaller radius of curvature at the end portions.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An elongate tape for forming a helically wound layer of interlocked windings in a flexible pipe body, the tape being configured for interlocking with adjacent windings, wherein the tape has a cross-sectional profile comprising;
    a first surface that in use forms a radially inner surface off the helically wound layer;
    a further surface, in use forming a side wall extending radially outwards, away from the first surface, and for forming a contact surface with a region of an adjacent winding; and
    a transition surface joining the first surface and further surface,
    wherein the transition surface comprises a curved surface, and
    wherein the curved surface has a larger radius of curvature in a region proximate the first surface than in a region proximate the further surface.

2. An elongate tape as claimed in claim 1, wherein the first surface blends smoothly into the transition surface.

3. An elongate tape as claimed in claim 1, wherein the radius of curvature of the curved surface decreases from the first surface to the further surface.

4. An elongate tape as claimed in claim 3, wherein the radius of curvature of the curved surface linearly decreases from the first surface to the further surface.

5. An elongate tape as claimed in claim 3, wherein the radius of curvature of the curved surface monotonically decreases from the first surface to the further surface.

6. An elongate tape as claimed in claim 1, wherein the curved surface forms a semi-parabolic curve.

7. An elongate tape as claimed in claim 1, further comprising a yet further surface in use forming a further side wall extending radially outwards, away from the first surface, and for forming a contact surface with a region of an adjacent winding; and a further transition surface joining the first surface and yet further surface, wherein the further transition surface comprises a curved surface, and wherein the curved surface has a larger radius of curvature in a region proximate the first surface than in a region proximate the yet surface.

8. An elongate tape as claimed in claim 7, wherein the further surface and the yet further surface are substantially parallel to each other.

9. An elongate tape as claimed in claim 1, wherein the first surface is substantially flat.

10. An elongate tape as claimed in claim 1, wherein the first surface is curved.

11. An elongate tape as claimed in claim 1, wherein the tape includes interlocked adjacent windings.

12. An elongate tape as claimed in claim 1, wherein the tape is configured to interlock with adjacent windings of a further tape.

13. An elongate tape as claimed in claim 1, wherein the tape has a Z-shaped profile.

14. An elongate tape as claimed in claim 13, wherein adjacent windings in the helically wound layer are interlocked by a hooked region of a winding nesting in a valley region of an adjacent winding.

15. A flexible pipe, comprising:
    a flexible pipe body for transporting conveyed fluids,
    an elongate tape helically wound on said flexible body to interlock adjacent windings, said elongate tape having a cross-sectional profile comprising:
a first surface that in use forms a radially inner surface of the helically wound layer,
a further surface, in use forming a side wall extending radially outwards, away from the first surface, and for forming a contact surface with a region of an adjacent winding, and
a transition surface joining the first surface and the further surface,
wherein the transition surface comprises a curved surface,
and wherein the curved surface has a larger radius of curvature in a region proximate the first surface than in a region proximate the further surface.

16. A flexible pipe as claimed in claim 15, further comprising at least one end fitting coupled to said flexible pipe body.

17. A riser comprising:
a flexible pipe body for transporting conveyed fluids,
an elongate tape helically wound on said flexible body to interlock adjacent windings,
said elongate tape having a cross-sectional profile comprising:
a first surface that in use forms a radially inner surface of the helically wound layer,
a further surface, in use forming a side wall extending radially outwards, away from the first surface, and for forming a contact surface with a region of an adjacent winding, and
a transition surface joining the first surface and the further surface,
wherein the transition surface comprises a curved surface,
and wherein the curved surface has a larger radius of curvature in a region proximate the first surface than in a region proximate the further surface.

18. The riser of claim 17, further comprising at least one end fitting coupled to said flexible pipe body.

19. A method of manufacturing a flexible pipe body, comprising
helically winding one or more tapes around a substantially tubular under-layer, where at least one of said tapes has a cross-sectional profile comprising:
a first surface that in use forms a radially inner surface of the helically wound layer, a further surface, in use forming a side wall extending radially outwards, away from the first surface, and for forming a contact surface with a region of an adjacent winding, and
a transition surface joining the first surface and the further surface,
wherein the transition surface comprises a curved surface, and wherein the curved surface has a larger radius of curvature in a region proximate the first surface than in a region proximate the further surface.

20. A method as claimed in claim 19, wherein the under-layer comprises a fluid retaining sheath.

21. A method as claimed in claim 19, further comprising forming one or more layers over the helically wound tape.

22. A flowline comprising:
a flexible pipe body for transporting conveyed fluids,
an elongate tape helically wound on said flexible body to interlock adjacent windings,
said elongate tape having a cross-sectional profile comprising:
a first surface that in use forms a radially inner surface of the helically wound layer,
a further surface, in use forming a side wall extending radially outwards, away from the first surface, and for forming a contact surface with a region of an adjacent winding, and
a transition surface joining the first surface and the further surface,
wherein the transition surface comprises a curved surface,
and wherein the curved surface has a larger radius of curvature in a region proximate the first surface than in a region proximate the further surface.

23. The flowline of claim 22, further comprising at least one end fitting coupled to said flexible pipe body.

24. A jumper comprising:
a flexible pipe body for transporting conveyed fluids,
an elongate tape helically wound on said flexible body to interlock adjacent windings,
said elongate tape having a cross-sectional profile comprising:
a first surface that in use forms a radially inner surface of the helically wound layer,
a further surface, in use forming a side wall extending radially outwards, away from
the first surface, and for forming a contact surface with a region of an adjacent winding, and
a transition surface joining the first surface and the further surface,
wherein the transition surface comprises a curved surface,
and wherein the curved surface has a larger radius of curvature in a region proximate the first surface than in a region proximate the further surface.

25. The jumper of claim 24, further comprising at least one end fitting coupled to said flexible pipe body.

* * * * *